United States Patent
Soong et al.

(10) Patent No.: US 8,675,579 B2
(45) Date of Patent: Mar. 18, 2014

(54) SYSTEM AND METHOD FOR ALLOCATING NETWORK RESOURCES FOR A COMMUNICATIONS LINK

(75) Inventors: Anthony C. K. Soong, Plano, TX (US); Philippe Sartori, Algonquin, IL (US); Brian Classon, Palatine, IL (US); Zhongfeng Li, Shanghai (CN); Rongting Gu, Shanghai (CN)

(73) Assignee: FutureWei Technologies, Inc., Plano, TX (US)

( * ) Notice: Subject to any disclaimer, the term of this patent is extended or adjusted under 35 U.S.C. 154(b) by 105 days.

(21) Appl. No.: 13/079,402

(22) Filed: Apr. 4, 2011

(65) Prior Publication Data

US 2011/0268056 A1    Nov. 3, 2011

Related U.S. Application Data

(60) Provisional application No. 61/330,591, filed on May 3, 2010.

(51) Int. Cl.
*H04W 72/04* (2009.01)

(52) U.S. Cl.
USPC .......................................... 370/329

(58) Field of Classification Search
USPC ................................. 370/280, 329
See application file for complete search history.

(56) References Cited

U.S. PATENT DOCUMENTS

| | | | |
|---|---|---|---|
| 7,822,420 B1 | 10/2010 | Schulz | |
| 2007/0230414 A1* | 10/2007 | Afrashteh et al. | 370/338 |
| 2010/0015923 A1* | 1/2010 | Golitschek | 455/67.7 |
| 2012/0147810 A1* | 6/2012 | Wang et al. | 370/315 |

FOREIGN PATENT DOCUMENTS

| | | |
|---|---|---|
| CN | 1344475 A | 4/2002 |
| CN | 101374264 A | 2/2009 |
| EP | 193705 A1 | 3/2008 |
| WO | WO 0022866 | 4/2000 |

(Continued)

OTHER PUBLICATIONS

Huawei, "Consideration on FDD Type 1 Relay Frame Structure," 3GPP TSG RAN WG1 meeting #57, R1-091807, May 4-8, 2009, 5 pages, San Francisco, CA., USA.

(Continued)

*Primary Examiner* — Huy D Vu
*Assistant Examiner* — Teisha D Hall
(74) *Attorney, Agent, or Firm* — Slater & Matsil, L.L.P.

(57) ABSTRACT

A system and method for a system and method for allocating network resources for a communications link are provided. A method for communications controller operations includes allocating network resources to a communications link. The communications link includes an uplink (UL) part and a downlink (DL) part. The method also includes if a type of the allocated network resources is not equal in the DL part and the UL part, transmitting a first indication of the allocated network resources for one part of either the UL part or the DL part and a second indication of the allocated network resources for a remaining part of either the UL part or the DL part. The first indication and the second indication are based on an amount of network resources allocated. The method further includes if the type of the allocated network resources is equal in the DL part and the UL part, transmitting an indication of the allocated network resources for one part of either the UL part or the DL part. The indication is based on an amount of network resources allocated.

26 Claims, 8 Drawing Sheets

(56) References Cited

FOREIGN PATENT DOCUMENTS

| WO | WO 0057660 A1 | 9/2000 |
|---|---|---|
| WO | WO 2008/008920 A2 | 1/2008 |
| WO | WO 2008/092160 A2 | 7/2008 |

OTHER PUBLICATIONS

"3rd Generation Partnership Project; Technical Specification Group Radio Access Network; Further Advancements for E-UTRA Physical Layer Aspects (Release 9)," 3GPP TR 36.814, V1.5.0, Nov. 2009, 53 pages.

Huawei, "Backhaul Subframe Configuration and HARQ for FDD Type 1 Relay," 3GPP TSG RAN WG1 Meeting #59, R1-094724, Nov. 9-13, 2009, 9 pages, Jeju Korea.

"3rd Generation Partnership Project; Technical Specification Group Radio Access Network; Evolved Universal Terrestrial Radio access (E-UTRA); Further advancements for E-UTRA physical layer aspects (Release 9)," 3GPP TR 36.814, V9.0.0, Mar. 2010, 104 pages.

Ericsson, "Un HARQ timing for FDD," 3GPP TSG-RAN WG1 #60bis, Tdoc R1-101749, Apr. 12-16, 2010, 4 pages, Beijing, China.

Nokia, "Issues on HARQ over Un Interface for FDD In-band Relay," 3GPP TSG-RAN WG1 Meeting #60bis, R1-101916, Apr. 12-16, 4 pages, Beijing, China.

Nokia, "Discussion on Symmetry and Asymmetry SF Allocation for Backhaul," 3GPP TSG-RAN WG1 Meeting #60b, R1-101918, Apr. 12-16, 3 pages, Beijing, China.

Huawei, "FDD Un HARQ Timeline Summary," 3GPP TSG RAN WG1 Meeting #60 bis, R1-101978, Apr. 12-16, 2010, 5 pages, Beijing, China.

Huawei, "Summary of FDD Un Subframe Allocation," 3GPP TSG RAN WG1 Meeting #60bis, R1-101980, Apr. 12-16, 2010, 4 pages, Beijing, China.

Panasonic, "[60-10-LTE-A]: Email discussion on backhaul design for Type 1 relays," 3GPP TSG RAN WG1 Meeting #60bis, R1-102538, Apr. 12-16, 2010, 11 pages, Beijing, China.

LG Electronics, Inc., "Necessity of Asymmetric Subframe Allocation," TSG-RAN WG1 Meeting #60b, R1-102545, Apr. 12-16, 2010, 4 pages, Beijing, China.

Extended European Search Report, Application No. 11777157.6, Applicant Huawei Technologies Co., Ltd., Jun. 4, 2013, 15 pages.

International Search Report, International Application No. PCT/CN2011/073594, Applicant: Huawei Technologies Co., Ltd., Aug. 11, 2011, 13 pages.

* cited by examiner

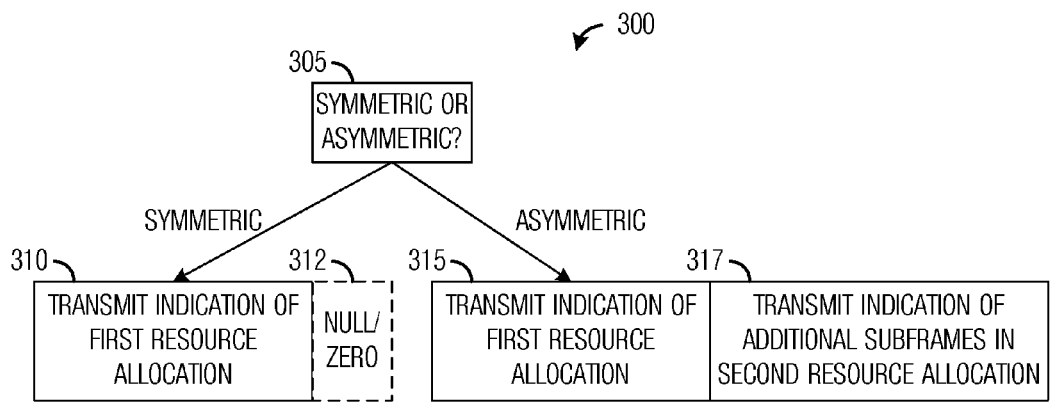
*Fig. 3a*
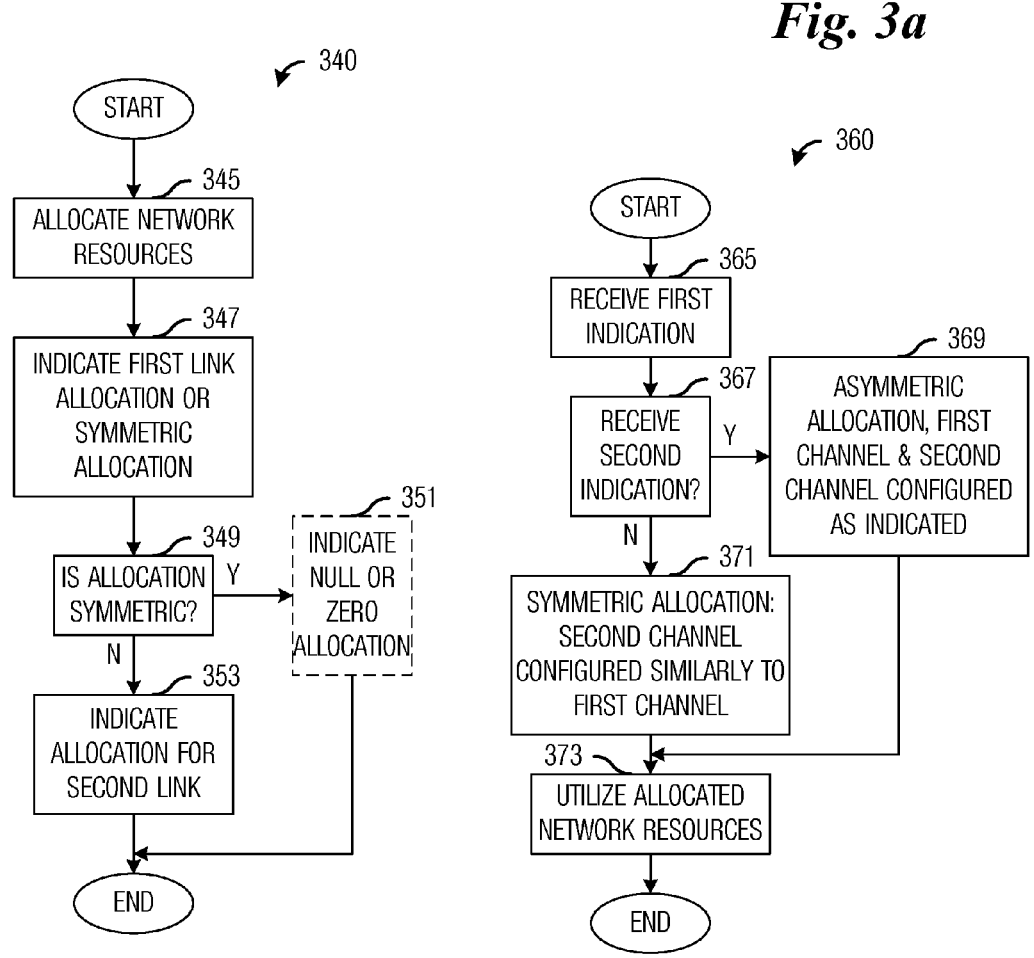
*Fig. 3b*  *Fig. 3c*

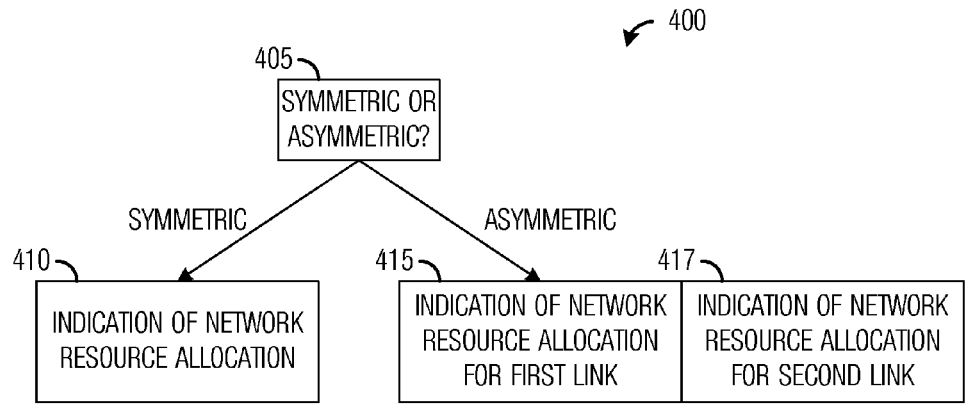
*Fig. 4a*
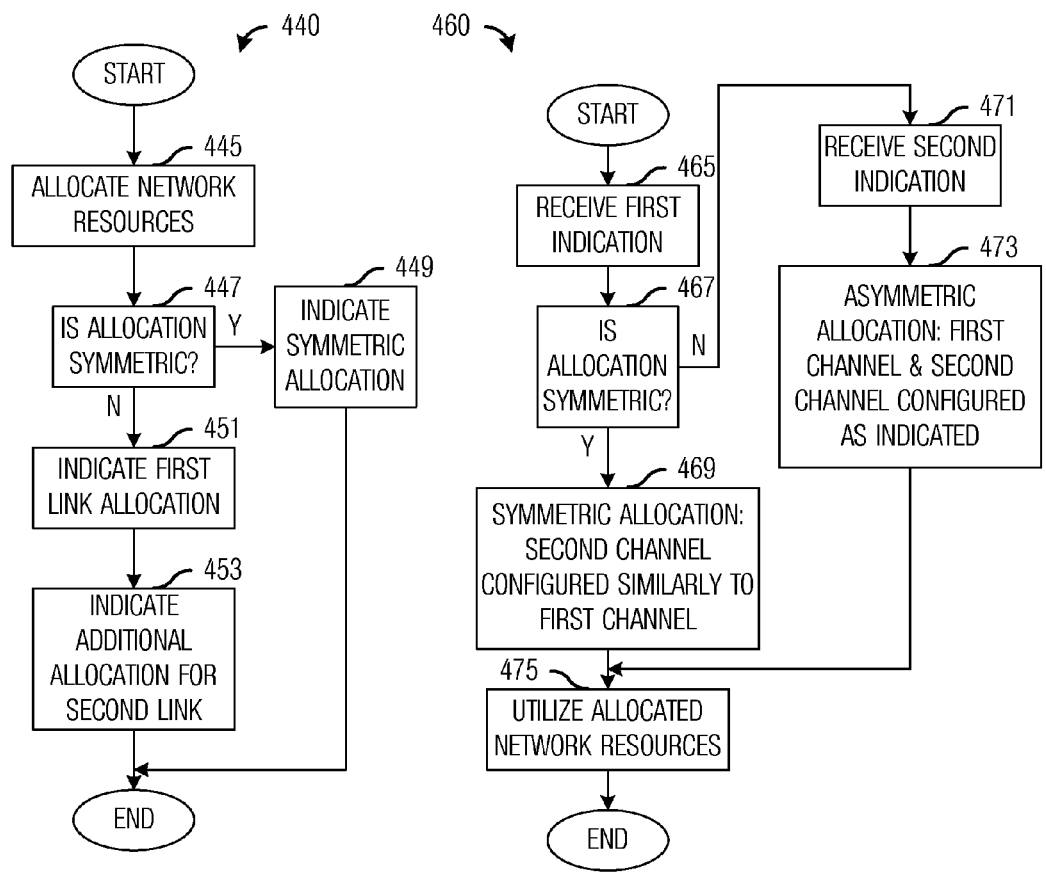
*Fig. 4b*          *Fig. 4c*

540 ↘ s7

| | FRAME 4N | FRAME 4N+1 | FRAME 4N+2 | FRAME 4N+3 |
|---|---|---|---|---|
| UL | 0 1 2 3 4 5 6 7 8 9 | 0 1 2 3 4 5 6 7 8 9 | 0 1 2 3 4 5 6 7 8 9 | 0 1 2 3 4 5 6 7 8 9 |
| DL | 0 1 2 3 4 5 6 7 8 9 | 0 1 2 3 4 5 6 7 8 9 | 0 1 2 3 4 5 6 7 8 9 | 0 1 2 3 4 5 6 7 8 9 |

| | FRAME 4N | FRAME 4N+1 | FRAME 4N+2 | FRAME 4N+3 |
|---|---|---|---|---|
| UL | 0 1 2 3 4 5 6 7 8 9 | 0 1 2 3 4 5 6 7 8 9 | 0 1 2 3 4 5 6 7 8 9 | 0 1 2 3 4 5 6 7 8 9 |
| DL | 0 1 2 3 4 5 6 7 8 9 | 0 1 2 3 4 5 6 7 8 9 | 0 1 2 3 4 5 6 7 8 9 | 0 1 2 3 4 5 6 7 8 9 |

*Fig. 5d*

SYSTEM AND METHOD FOR ALLOCATING NETWORK RESOURCES FOR A COMMUNICATIONS LINK

This application claims the benefit of U.S. Provisional Application No. 61/330,591, filed on May 3, 2010, entitled "Asymmetric Uplink Downlink Subframe Allocation for Relay Backhaul Link," which application is hereby incorporated herein by reference.

TECHNICAL FIELD

The present invention relates generally to digital communications, and more particularly to a system and method for allocating network resources for a communications link.

BACKGROUND

A relay node (RN), or simply relay, is considered as a tool to improve, e.g., the coverage of high data rates, group mobility, temporary network deployment, the cell-edge throughput and/or to provide coverage in new areas. The RN is wirelessly connected to a wireless communications network via a donor cell (also referred to as a donor enhanced Node B (donor eNB or D-eNB)).

The donor eNB provides some of its own network resources for use by the RN. The network resources assigned to the RN may be controlled by the RN, as if the donated network resources were its own network resources.

SUMMARY OF THE INVENTION

These and other problems are generally solved or circumvented, and technical advantages are generally achieved, by example embodiments of the present invention which a system and method for allocating network resources for a communications link.

In accordance with an example embodiment of the present invention, a method for communications system operations is provided. The method includes allocating network resources to a communications link. The communications link includes an uplink (UL) part and a downlink (DL) part. The method also includes if a type of the allocated network resources is not equal in the DL part and the UL part, transmitting a first indication of the allocated network resources for one part of either the UL part or the DL part and a second indication of the allocated network resources for a remaining part of either the UL part or the DL part. The first indication and the second indication are based on an amount of network resources allocated. The method further includes if the type of the allocated network resources is equal in the DL part and the UL part, transmitting an indication of the allocated network resources for one part of either the UL part or the DL part. The indication is based on an amount of network resources allocated.

In accordance with another example embodiment of the present invention, a method for communications device operations is provided. The method includes receiving an indication of allocated network resources for a communications link. The communications link includes an uplink (UL) part and a downlink (DL) part, the indication is based on an amount of network resources allocated, and a type of network resources allocation, and the type of network resource allocation comprises either an equal allocation or an unequal allocation. The method also includes determining the allocated network resources from the indication, and utilizing a subset of the allocated network resources to communicate.

In accordance with another example embodiment of the present invention, a communications system is provided. The communications system includes a resource allocator, an indication generator coupled to the resource allocator, and a transmitter coupled to the indication generator. The resource allocator allocates network resources to a communications link, wherein the communications link comprises an uplink (UL) part and a downlink (DL) part. The indication generator generates an indication of the allocated network resources for one part of either the UL part or the DL part in response to determining that a network resource allocation is equal in the DL part and the UL part, or generates a first indication of the allocated network resources for one part of either the UL part or the DL part and a second indication of the allocated network resources for a remaining part of either the UL part or the DL part in response to determining that the network resource allocation is not equal in the DL part and the UL part. The indication, the first indication, and the second indication are based on an amount of network resources allocated. The transmitter transmits the indication or to transmit the first indication and the second indication to a communications device.

One advantage disclosed herein is that both symmetric and asymmetric network resource allocations are supported. Therefore, there is flexibility in allocating network resources to meet changing communications system requirements. Furthermore, it enables backward compatibility with symmetric resource allocations.

A further advantage of exemplary embodiments is that an overhead in the signaling of network resource allocations may be small, thereby reducing an impact of signaling overhead on overall communications system performance.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 3a illustrates an example selection process 300 for signaling network resource allocations for a communications link according to example embodiments described herein;

FIG. 3b illustrates an example flow diagram of D-eNB operations 340 in allocating and signaling network resources for a communications link according to example embodiments described herein;

FIG. 3c illustrates an example flow diagram of RN operations 360 in receiving an indication(s) for and utilizing network resources allocated by a D-eNB according to example embodiments described herein;

FIG. 4a illustrates an example diagram of a selection process 400 for signaling network resource allocations for a communications link according to example embodiments described herein;

FIG. 4b illustrates an example flow diagram of D-eNB operations 440 in allocating and signaling network resources for a communications link according to example embodiments described herein;

FIG. 4c illustrates an example flow diagram of RN operations 460 in receiving an indication(s) for and utilizing network resources allocated by a D-eNB according to example embodiments described herein;

FIG. 5c illustrates an example frame structure 540 for four consecutive frames in a 3GPP LTE Release-10 compliant communications system with the current Un subframe allocation procedure, with an indication for an asymmetric network resource allocation being based on a symmetric network resource allocation according to example embodiments described herein;

FIG. 5d illustrates an example frame structure 560 for four consecutive frames with another possible Un subframe allocation procedure, with an indication for an asymmetric network resource allocation being based on a symmetric network resource allocation according to example embodiments described herein;

DETAILED DESCRIPTION

The making and using of the current example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1A:
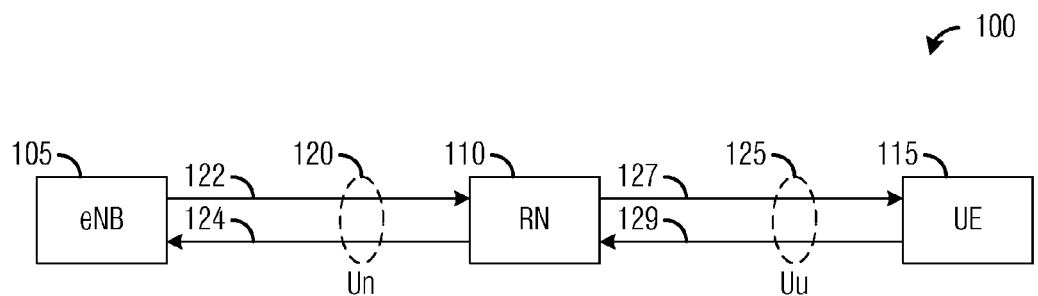
FIG. 1a illustrates an example communications system.

The present invention will be described with respect to example embodiments in a specific context, namely a Third Generation Partnership (3GPP) Long Term Evolution (LTE) compliant communications system with at least one RN. The invention may also be applied, however, to other communications systems with at least one RN, such as future releases of 3GPP LTE, WiMAX, IEEE 802.16, and so forth, compliant communications systems, based on multi-carrier modulation or other multiple access techniques such as CDMA FIG. 1a illustrates a communications system 100. Communications system 100 includes an enhanced NodeB (eNB) 105, which may also be commonly referred to as a controller, a communications controller, a base station, a NodeB, and so on. Communications system 100 also includes a RN 110 and a User Equipment (UE) 115. A UE may also be commonly referred to as a mobile, mobile station, subscriber, user, terminal, and so forth. If eNB 105 is allocating network resources to RN 110, as is shown in FIG. 1a, eNB 105 may also be referred to as a donor eNB or D-eNB.

Communications between eNB 105 and RN 110 may occur over an Un link 120 that comprises an Un downlink (DL) channel 122 and an Un uplink (UL) channel 124. Un interface 120 may also be referred to as a wireless backhaul link, although it could also be applied on a wired link. Communications between RN 110 and UE 115 may occur over a Uu link 125 that comprises a Uu DL channel 127 and a Uu UL channel 129.

Network resources for use on Un DL channel 122 and Un UL channel 124 of Un link 120 may be allocated by eNB 105, hence it may be necessary for eNB 105 to indicate to the RN which network resources, such as subframes, are available for DL or UL transmissions.

Generally, the allocation and/or indication of network resources should be flexible and should meet changing communications system operating requirements. Several resource allocation schemes may be possible:

1) Symmetric allocation, wherein the same (or equal) amount of network resources, e.g., subframes, is allocated on a DL and on an UL; and 2) Asymmetric allocation, wherein different (or unequal) amounts of network resources are allocated on a DL and on an UL. Typically, more network resources are allocated on a DL than on an UL, but situations exist where more network resources may be dedicated to an UL than a DL.

Figure 1B:
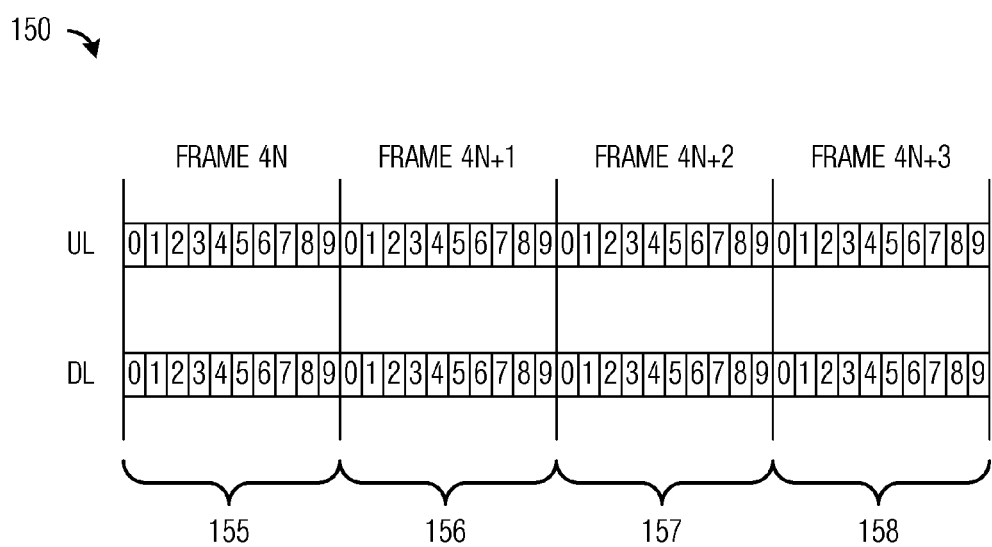
FIG. 1b illustrates an example frame structure in a 3GPP LTE Release-10 compliant communications system.

FIG. 1b illustrates a set of four frames structure 150 in a 3GPP LTE Release-10 compliant communications system. As shown in FIG. 1b, set of four frames structure 150 includes a number of frames, such as frame 4N 155, frame 4N+1 156, frame 4N+2 157, and frame 4N+3 158, where N is a positive integer value. Each frame includes a number of subframes. In 3GPP LTE Release-10, a frame includes 10 subframes, numbered from subframe zero to subframe nine. Each subframe has a 1 ms duration. In a frequency division duplex communications system, both DL and UL channels may exist at the same time, while in a time division duplex communications system, DL and UL channels may alternate in time. In a 3GPP LTE compliant communications system, subframes may be allocated on a single frame basis with a 10 ms periodicity or a four frame basis with a 40 ms periodicity.

However, not all subframes in a single frame may be allocated for use in the wireless backhaul link. As an example, in a Un frame, subframes numbered 0, 4, 5, and 9 may not be reserved as Multi-Media Broadcast over a Single Frequency Network (MBSFN) subframes and thus may not be allocated for DL usage on the Un DL for a Frequency Division Duplex (FDD) communications system. Similarly, subframes 4, 8, 9, and 3 may not be allocated for UL usage on the Un UL for a FDD system. For a Time Division Duplex (TDD) communications system, similar restrictions exist.

In general, a subframe may include more than one assignable network resource; however, for the wireless backhaul link, resources are allocated with a one subframe granularity. The allocated subframe may be shared with other RNs and UEs directly served by the eNB. The smallest unit of network resources that may be allocated may vary depending on communications system specification, therefore, the discussion of subframes as network resource units and the allocation of subframes should not be construed as being limiting to either the scope or the spirit of the example embodiments.

Figures 2A, 2B:
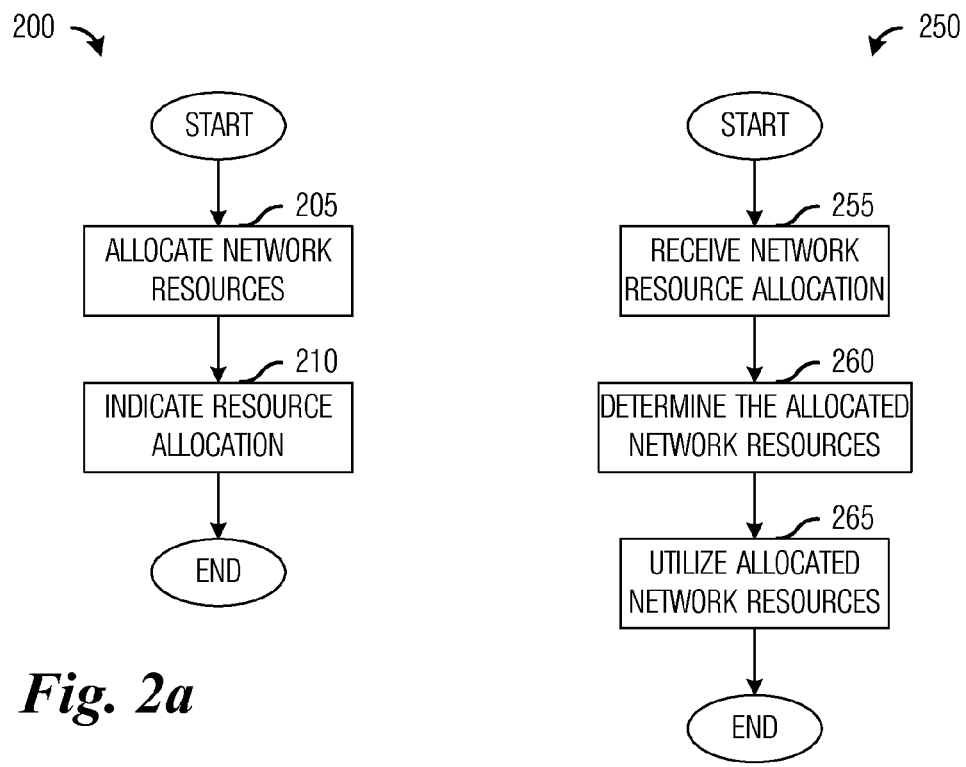
FIG. 2a illustrates an example flow diagram of high-level D-eNB operations in allocating and signaling network resources for a communications link according to example embodiments described herein.
FIG. 2b illustrates an example flow diagram of high-level RN operations 250 in receiving an indication(s) for and utilizing network resources allocated by a D-eNB

FIG. 2a illustrates a flow diagram of high-level D-eNB operations 200 in allocating and signaling network resources for a communications link. D-eNB operations 200 may be indicative of operations occurring in a D-eNB as the D-eNB allocates network resources to a RN and then signals the network resource allocation to the RN. D-eNB operations 200 may occur while the D-eNB is in a normal operating mode and has an RN attached.

D-eNB operations 200 may begin with the D-eNB allocating network resources for use by the RN (block 205). According to an example embodiment, the D-eNB may allocate network resources for a communications link, such as a wireless backhaul link, for use by the RN. The D-eNB may allocate network resources for a DL and/or an UL portion of the communications link. If the D-eNB is allocating network resources for both the DL and/or the UL portions, then the D-eNB may need to provide information about the network resources allocated to the DL and the UL portions, however, depending on the nature of how resource allocation and how the resource allocation information is provided to the RN, the D-eNB may not need to provide full information to the RN, thereby reducing signaling overhead.

Generally, there may be two types of network resource allocations: symmetric and asymmetric. A symmetric allocation means that paired network resources (or corresponding network resources) are allocated for both the DL and the UL portions of the communications link, while an asymmetric allocation means that different network resources are allocated for the DL and the UL portions. In general terms, a symmetric allocation is an equal allocation, wherein equal amounts of network resources are allocated for the DL and the UL, and the network resources are similarly arranged for both. In a 3GPP LTE Release-10 compliant communications system, a symmetric allocation is used, and an UL network resource follows a DL network resource four subframes later.

Generally, to simplify the network resource allocation, network resource allocations for the UL and network resource allocations for the DL may be considered to be the symmetric if the same amount of network resources are allocated to the UL and the DL and if the network resources are arranged similarly. For example, if subframes 1, 2, and 3 are allocated for the DL, then in order to be a symmetric network resource allocation, three contiguous subframes must be allocated for the UL (e.g., subframes 5, 6, and 7 for LTE). If three non-contiguous subframes are allocated for the DL, then the network resource allocation is an asymmetric allocation although the same amount of network resources is allocated.

Network resource allocations are considered to be asymmetric if different amounts of network resources are allocated to either the DL or the UL or if the same amount of network resources are allocated, but the network resources are arranged differently. In general, an asymmetric allocation is an unequal allocation. The inequality may be in terms of amount of network resources allocated and/or arrangement of the network resources. Examples of asymmetric network resource allocations in a communications system with a frame structure of 10 subframes per frame, may include: subframes 1, 2, and 3 for the DL and subframes 1, 2, and 4 for the UL; subframes 1, 2, and 3 for the DL and subframes 2 and 3 for the UL.

After allocating the network resources, the D-eNB may send information regarding the network resource allocation(s) to the RN (block 210). The information may be sent using radio resource control (RRC) signaling. If network resources were allocated to only one portion of the communications link, e.g., the DL portion or the UL portion, then the D-eNB may send information related to the entire network resource allocation to the RN.

According to an example embodiment, the D-eNB may transmit an indication representative of the network resource allocation to the RN. As a non limiting example, the indication may be a bitmap where individual bits represent network resource units that may be allocated may be transmitted to the RN. To reduce signaling overhead, the indication may only contain information about network resource units that may be used for allocation to the RN. Network resource units that may not be allocated to the RN should not be included in the indication.

If network resources were allocated to both portions of the communications link, then the D-eNB may be able to reduce the amount of signaling required to provide information regarding the network resource allocation to the RN. As an example, with a symmetric allocation where the network resource allocation for the DL and the UL are identical, the D-eNB may only need to provide information regarding the network resource allocation for a first link (either the DL or the UL) and the RN may be able to determine the network resource allocation for a second link (either the UL or the DL) implicitly. This is what is done for LTE Release-10, wherein only the DL resource allocation is explicitly signaled. The RN derives the UL allocation by offsetting the DL allocation by four subframes.

As an example, consider a 3GPP LTE compliant communications system with a symmetric network resource allocation, an implicit UL network resource allocation may be based on an explicit DL network resource allocation. An 8-bit long bitmap may be used for indicating either subsets and/or patterns used on the DL with 40 ms periodicity, with each bit signaling an allocation of three subframes, as described in 3GPP Technical Standard TS 36.216, v10.1.0. Thus, a maximum total of 24 subframes can be allocated for the DL Un link. Furthermore, there may be a four-subframe offset between network resources in the DL and the UL.

As an example, consider communications system derived from 3GPP LTE with an asymmetric network resource allocation, a DL network resource allocation may include more or less network resources than an UL network resource allocation, and an indication for the DL network resource may indicate the network resource differences with respect to the UL network resource allocation. There may still be an offset between network resources in the DL and the UL, but to support standalone network resources a variable offset may be utilized, wherein the variable offset may be based on the standalone network resource and a nearest (or some other specified) network resource.

Although the discussion presented herein focuses on the backhaul link (i.e., the Un link) between an eNB and a RN, the example embodiments may be applicable to other links wherein network resources may be allocated by a communications controller for use by a communications device. Therefore the focus on the backhaul link should not be construed as being limiting to either the scope or the spirit of the embodiments.

FIG. 2b illustrates a flow diagram of high-level RN operations 250 in receiving an indication(s) for and utilizing network resources allocated by a D-eNB. RN operations 250 may be indicative of operations occurring in a RN as the RN receives an indication(s) for network resources allocated to the RN by the D-eNB and then makes use of the network resources. RN operations 250 may occur while the RN is in a normal operating mode and is attached to the D-eNB.

RN operations 250 may begin with the RN receiving information about the network resource allocations from the D-eNB (block 255). According to an example embodiment, the information about the network resource allocations may be in the form of indication(s) that indicate which network resource units, e.g., subframes, have been allocated to the RN. As an example, if the D-eNB has allocated network resources to both links (DL and UL) of the communications link, then the RN may receive adequate information to allow it to determine which network resources have been allocated for which link (block 260).

According to an example embodiment, if the network resource allocation is for both links and if the network resource allocation is a symmetric allocation, then the RN may receive a single indication for either the DL or the UL. The RN may then determine the network resource allocation for the DL or the UL directly from the single indication. The RN may also be able to determine the network resource allocation for the UL or the DL implicitly using the information contained the single indication and some calculation. Details of example calculations are provided below.

According to an example embodiment, if the network resource allocation is for both links and if the network resource allocation is an asymmetric allocation, then the RN may receive an indication for both the DL and the UL. The RN may then determine the network resource allocation for the DL or the UL directly from the two indications.

The RN may then utilize the allocated network resources to communicate (block 265).

FIG. 3a illustrates a diagram of a selection process 300 for signaling network resource allocations for a communications link. Selection process 300 may occur in a D-eNB of a communications system as the D-eNB allocates network resources to a RN.

Selection process 300 may begin with the D-eNB determining if the network resource allocation is to be a symmetric allocation where similar network resource allocations will be made to both the UL and the DL of the communications link or an asymmetric allocation wherein different network resource allocations may be made to the UL and the DL of the communications link (block 305).

If the network resource allocation is a symmetric allocation, then it may be possible to specify a network resource allocation for a first link (either the UL or the DL) and have the RN determine implicitly the network resource allocation for a second link (either the DL or the UL) from the network resource allocation for the UL or the DL provided by the D-eNB. According to an example embodiment, after allocating the network resources for either the first link (either UL or DL), the D-eNB may transmit an indication of the network resources allocated to the first link to the RN (block 310). The D-eNB may also optionally transmit a blank indication (e.g., a null and/or zero indication) to signify that the network resource allocation for the second link is the same as the network resource allocation for the first link, i.e., the resource allocation is a symmetric allocation (block 312). As an example, the D-eNB may allocate one or more subframes to the RN for use in the DL. The D-eNB may generate a bitmap of the subframe structure as the indication of the network resources allocated to the DL and transmit the bitmap to the RN. Each element of the bitmap may indicate one or more subframes (e.g., a subframe pattern of three, as defined for 3GPP LTE).

If the network resource allocation is an asymmetric allocation, then it may not be possible for the RN to determine the network resource allocation for the second link (either the DL or the UL) from the network resource allocation of the first link (either the UL or the DL). Therefore, it may be necessary for the D-eNB to transmit indications of both the UL and the DL to the RN. According to an example embodiment, after allocating the network resources for the first link, the D-eNB may transmit an indication of the network resources allocated to the first link, e.g., a first resource allocation, to the RN (block 315). Then, after allocating the network resources for the second link (either the DL or the UL), the D-eNB may transmit an indication of the network resources allocated to the second link, e.g., a second resource allocation, to the RN (block 317).

Instead of transmitting the indication of the entire second resource allocation, the D-eNB may send an indication of network resources allocated for the second link in addition to the network resources allocated for the first link to the RN. Alternatively, instead of transmitting the indication of the entire second resource allocation, the D-eNB may send an indication of network resources not allocated for the second link but allocated for the first link to the RN.

According to an example embodiment, the first indication and the second indication may be transmitted to the RN in separate messages. Therefore, if the D-eNB elects to not transmit the blank indicator (e.g., a null and/or a zero indicator) to signify that the network resource allocation for the second link is the same as the network resource allocation for the first link, then the D-eNB may transmit only a single message comprising the first indication. If the allocation is asymmetric, the second indication may be transmitted in a separate message, using the same or a different format.

According to an embodiment, the RN may perform blind detection or some other detection technique to detect the presence of the second message. If the network resource allocation was a symmetric allocation and the D-eNB did not transmit a second indication in a second message, then the RN may need to stop detecting for the second message after a period of time.

According to an example embodiment, an indicator may be added to the first indication or transmitted in a separate message, where the indicator may be used to indicate a symmetric allocation or an asymmetric allocation. As an example, with a symmetric allocation, the D-eNB may transmit a message including the first indication and the indicator set to a value indicating that the network resource allocation is a symmetric allocation to the RN. The D-eNB may not have to transmit a second message including the second indication to the RN. While at the RN, if the RN decodes the first transmission and finds that the indicator is set to the value indicating a symmetric allocation, it may not need to attempt to detect the second message. With an asymmetric allocation, the D-eNB may transmit a message including the first indication and the indicator set to a value indicating that the network resource allocation is an asymmetric allocation to the RN. The RN then knows that there will be a second transmission containing the second indication.

As an example, a one-bit indicator may be used to indicate the network resource allocation type, with a first value indicating a symmetric network resource allocation and a second value indicating an asymmetric network resource allocation.

According to an example embodiment, the first indication and the second indication may be transmitted to the RN as part of a single message. Since both the first indication and the second indication are contained in a single message, both need to be transmitted to the RN. Hence, if the network resource allocation is a symmetric allocation, then the second indication may be a null and/or zero indication, i.e., a blank indication. An indicator may also be included to signify a symmetric allocation or an asymmetric allocation.

FIG. 3b illustrates a flow diagram of D-eNB operations 340 in allocating and signaling network resources for a communications link. D-eNB operations 340 may be indicative of operations occurring in a D-eNB as the D-eNB allocates network resources to a RN and then signals the network resource allocation to the RN. D-eNB operations 340 may be an implementation of D-eNB operations 200. D-eNB operations 340 may occur while the D-eNB is in a normal operating mode and has an RN attached.

D-eNB operations 340 may begin with the D-eNB allocating network resources for use by the RN (block 345). According to an example embodiment, the D-eNB may make a symmetric allocation or an asymmetric allocation.

Regardless if the network resource allocation is symmetric or asymmetric, the D-eNB may send an indication of the network resources allocated to a first link (either a DL or an UL) (block 347). According to an embodiment, the indication may be a bitmap of length N with each bit representing a network resource unit, such as a subframe or a subframe pattern, where N is a number of network resource units that may potentially be allocated to the RN. As an example, consider a frame with 10 subframes and all 10 subframes may be allocated, then the indication may be a 10-bit bitmap. If a bit of the bitmap is set to a first value, then a corresponding subframe may be allocated for use by the RN, while if the bit is set to a second value, then the corresponding subframe may not be allocated for use by the RN.

According to an example embodiment, the indication may have a period that is a multiple of a frame period. For example, in a 3GPP LTE Release-10 compliant communications system, the indication may have a period of one frame or four frames. In an asymmetric network resource allocation, a length of a second indication for a second link, which may be based on a first indication for a first link, may be different from a length of the first indication. In other words, the second indication may be equal to or longer than the first indication or the second indication may be equal to or shorter than the first indication, depending on how the second indication is generated.

According to an example embodiment, in some communications systems, some subframes may not be available for allocation. The indication may then be shortened to reduce signaling overhead. For example, in a 3GPP LTE compliant communications system, four subframes of a 10 subframe frame may be reserved for MBSFN use and may not be allocated for other uses. It may then be possible to use a 6-bit long bitmap to represent the six eligible subframes. Similarly, in a 3GPP LTE compliant communications system, it may be possible to allocate subframes in a four frame group of frames. In such a situation, then a 24-bit long bitmap may be used to represent the 24 eligible subframes in the four frame group. By not indicating the ineligible subframes, a reduction in signaling overhead may be achieved.

According to an example embodiment, if the resource allocation is symmetric, then information contained in the indication of the network resource allocation for first link may be sufficient for the RN to determine the network resource allocation for the second link (either the UL or the DL). As an example, since in a symmetric allocation, the number of network resources allocated and their arrangement is the same, the RN may need to only know an offset within the subframe to derive the network resources allocated for the second link. The offset may be a pre-specified or pre-configured value. Therefore, the subframes allocated for the second link may be expressed as $$SF_{2L}=(SF_{1L}+\text{offset}) \text{ modulo allocation\_period},$$

where $SF_{1L}$ is the subframes allocated for the first link, $SF_{2L}$ is the subframes allocated for the second link, and allocation_period is a number of subframes in a total number of frames specified in the network resource allocation.

Since the RN may be able to determine the network resources allocated for the second link, the D-eNB may not need to indicate the network resource allocation for the second link, thereby further reducing signaling overhead. According to an example embodiment, the D-eNB may optionally indicate a null indication, a zero indication, or so forth, to the RN (block 351).

If the network resource allocation is asymmetric, then the D-eNB may then indicate the network resource allocation for the second link (block 353). According to an example embodiment, the indication for the network resource allocation for the second link may be similar in nature to the indication for the network resource allocation for the first link. According to another example embodiment, the indication for the network resource allocation for the second link may include indications of subframes that are allocated for the second link but not allocated for the first link. According to another example embodiment, the indication for the network resource allocation for the second link may include indications of subframes that are not allocated for the second link but are allocated for the first link.

FIG. 3c illustrates a flow diagram of RN operations 360 in receiving an indication(s) for and utilizing network resources allocated by a D-eNB. RN operations 360 may be indicative of operations occurring in a RN as the RN receives an indication(s) for network resources allocated to the RN by the D-eNB and then makes use of the network resources. RN operations 360 may be an implementation of RN operations 250. RN operations 360 may occur while the RN is in a normal operating mode and is attached to the D-eNB.

RN operations 360 may begin with the RN receiving a first indication of allocated network resources from the D-eNB (block 365). According to an example embodiment, the first indication may be for network resources allocated for a first link (either a DL or an UL). As discussed previously, the indication may be an N-bit bitmap with each bit representing a network resource unit that may be allocated, where N is a positive integer value. The indication may be for N or more network resource units, some of which may not be available for allocation.

The RN may also receive a second indication of allocated network resources from the D-eNB (block 367). In general, if the RN receives the second indication, then the network resource allocation was an asymmetric network resource allocation and the first indication may convey information about network resource units allocated for the first link and the second indication may convey information about network resource units allocated for a second link (either an UL or a DL) (block 369). However, if the second indication is a null indication, a zero indication, or so forth, then the network resource allocation may be a symmetric network resource allocation. If the allocation is symmetric, the second indication may not need to be present at all.

If the RN does not receive the second indication or if the second indication is a null indication, a zero indication, or so forth, then the network resource allocation is a symmetric network resource allocation and the first indication may convey information about both the first link and the second link (block 371). According to an embodiment, the information contained in the first indication with additional processing may provide information about the network resource allocation for the second link. For example, the information contained in the first indication plus an offset modulo an allocation_period may be equal to information regarding the second link.

The RN may make use of network resources in the allocated network resource units to communicate with the DeNB (block 373).

FIG. 4a illustrates a diagram of a selection process 400 for signaling network resource allocations for a communications link. Selection process 400 may occur in a D-eNB of a communications system as the D-eNB allocates some of its network resources to a RN.

Selection process 400 may begin with the D-eNB determining if the network resource allocation is to be a symmetric allocation or an asymmetric allocation (block 405). If the network resource allocation is a symmetric allocation, then it may be possible to specify a network resource allocation for a first link (either the UL or the DL) and have the RN determine the network resource allocation for a second link (either the DL or the UL) from the network resource allocation for the UL or the DL provided by the D-eNB. According to an example embodiment, after allocating the network resources for either the first link, the D-eNB may transmit an indication of the network resources allocated to the first link to the RN (block 410).

If the network resource allocation is an asymmetric allocation, then it may not be possible for the RN to determine the network resource allocation for the second link (either the DL or the UL) from the network resource allocation of the first link (either the UL or the DL). Therefore, it may be necessary for the D-eNB to transmit indications of both the UL and the DL to the RN. According to an example embodiment, after allocating the network resources for the first link, the D-eNB may transmit an indication of the network resources allocated to the first link, e.g., a first resource allocation, to the RN (block 415). Then, after allocating the network resources for the second link (either the DL or the UL), the D-eNB may transmit an indication of the network resources allocated to the second link, e.g., a second resource allocation, to the RN (block 417).

Instead of transmitting the indication of the entire second resource allocation, the D-eNB may send an indication of network resources allocated for the second link in addition to the network resources allocated for the first link to the RN. Alternatively, instead of transmitting the indication of the entire second resource allocation, the D-eNB may send an indication of network resources not allocated for the second link but allocated for the first link to the RN. Alternatively, the D-eNB may send two indications. A first indication indicates part of the first link resource allocation, and a second indication indicates a remaining part of the first link resource allocation. Based on one of the two indications or part of first link resource allocation indication, the second link resource allocation can be derived.

According to an example embodiment, the first indication and the second indication may be transmitted to the RN in separate messages. Therefore, if the D-eNB performs a symmetric allocation, then the D-eNB may transmit only a single message comprising the first indication.

According to an embodiment, the RN may perform blind detection or some other detection technique to detect the presence of the second message. Alternatively, the second message may be sent using the same or a different format, and higher layer signaling. If the network resource allocation was a symmetric allocation, then the RN may need to stop detecting for the second message after a period of time.

According to an example embodiment, an indicator may be added to the first indication or transmitted in a separate message, where the indicator may be used to indicate a symmetric allocation or an asymmetric allocation. As an example, with a symmetric allocation, the D-eNB may transmit a message including the first indication and the indicator set to a value indicating that the network resource allocation is a symmetric allocation to the RN. The D-eNB may not have to transmit a second message including the second indication to the RN. While at the RN, if the RN decodes the first transmission and finds that the indicator is set to the value indicating a symmetric allocation, it may not need to attempt to detect the second message. With an asymmetric allocation, the D-eNB may transmit a message including the first indication and the indicator set to a value indicating that the network resource allocation is an asymmetric allocation to the RN. The RN then knows that there will be a second transmission containing the second indication.

According to an example embodiment, the first indication and the second indication may be transmitted to the RN as part of a single message. Since both the first indication and the second indication are contained in a single message, both need to be transmitted to the RN. Hence, if the network resource allocation is a symmetric allocation, then the second indication may be a null and/or zero indication. An indicator may also be included to signify a symmetric allocation or an asymmetric allocation.

FIG. 4b illustrates a flow diagram of D-eNB operations 440 in allocating and signaling network resources for a communications link. D-eNB operations 440 may be indicative of operations occurring in a D-eNB as the D-eNB allocates network resources to a RN and then signals the network resource allocation to the RN. D-eNB operations 440 may be an implementation of D-eNB operations 200. D-eNB operations 440 may occur while the D-eNB is in a normal operating mode and has an RN attached.

D-eNB operations 440 may begin with the D-eNB allocating network resources for use by the RN (block 445). According to an example embodiment, the D-eNB may make a symmetric allocation or an asymmetric allocation.

The D-eNB may perform a check to determine if the network resource allocation is a symmetric allocation or an asymmetric allocation (block 447). If the network resource allocation is a symmetric allocation, the D-eNB may send an indication of the network resources allocated to a first link (either a DL or an UL) (block 449). According to an embodiment, the indication may be a bitmap of length N with each bit representing a network resource unit, such as a subframe, where N is a number of network resource units that may potentially be allocated to the RN. As an example, consider a frame with 10 subframes and all 10 subframes may be allocated, then the indication may be a 10-bit bitmap. If a bit of the bitmap is set to a first value, then a corresponding subframe may be allocated for use by the RN, while if the bit is set to a second value, then the corresponding subframe may not be allocated for use by the RN.

According to an example embodiment, when the first link is downlink, for example, the second link may be downlink as well. As an example, consider a first indication being an indication of allocated network resources for a downlink. Then, since the network resource allocation may be a symmetric allocation, allocated network resources for an uplink may be determined from the allocated network resources for the downlink. Then, a second indication may also be an indication of allocated network resources for the downlink, thereby indicating changes in allocated network resources for the downlink.

According to an example embodiment, in some communications systems, some subframes may not be available for allocation. The indication may then be shortened to reduce signaling overhead. For example, in a 3GPP LTE compliant communications system, four subframes of a 10 subframe frame may be reserved for MBSFN use and may not be allocated for other uses. It may then be possible to use a 6-bit long bitmap to represent the six eligible subframes. Similarly, in a 3GPP LTE compliant communications system, it may be possible to allocate subframes in a four frame group of frames. In such a situation, then a 24-bit long bitmap may be used to represent the 24 eligible subframes in the four frame group. By not indicating the ineligible subframes, a reduction in signaling overhead may be achieved.

If the network resource allocation is an asymmetric allocation, the D-eNB may send an indication of the network resources allocated to the first link (either a DL or an UL) (block 451) and then indicate the network resource allocation for a second link (either the UL or the DL) (block 453). When the first link is downlink, the second link may be downlink as well. According to an embodiment, the indication for the first link may be a bitmap of length N with each bit representing a network resource unit, such as a subframe, where N is a number of network resource units that may potentially be allocated to the RN. As an example, consider a frame with 10 subframes and all 10 subframes may be allocated, then the indication may be a 10-bit bitmap. If a bit of the bitmap is set to a first value, then a corresponding subframe may be allocated for use by the RN, while if the bit is set to a second value, then the corresponding subframe may not be allocated for use by the RN.

According to an example embodiment, the indication for the network resource allocation for the second link may be similar in nature to the indication for the network resource allocation for the first link. According to another example embodiment, the indication for the network resource allocation for the second link may include indications of subframes that are allocated for the second link but not allocated for the first link. According to another example embodiment, the indication for the network resource allocation for the second link may include indications of subframes that are not allocated for the second link but are allocated for the first link.

FIG. 4c illustrates a flow diagram of RN operations 460 in receiving an indication(s) for and utilizing network resources allocated by a D-eNB. RN operations 460 may be indicative of operations occurring in a RN as the RN receives an indication(s) for network resources allocated to the RN by the D-eNB and then makes use of the network resources. RN operations 460 may be an implementation of RN operations 250. RN operations 460 may occur while the RN is in a normal operating mode and is attached to the D-eNB.

RN operations 460 may begin with the RN receiving a first indication of allocated network resources from the D-eNB (block 465). According to an example embodiment, the first indication may be for network resources allocated for a first link (either a DL or an UL). As discussed previously, the indication may be an N-bit bitmap with each bit representing a network resource unit that may be allocated, where N is a positive integer value. The indication may be for N or more network resource units, some of which may not be available for allocation.

The RN may then perform a check to determine if the network resource allocation is a symmetric allocation or an asymmetric allocation (block 467). If the network resource allocation is a symmetric allocation, then the RN may have all of the information that it needs to determine the network resources allocated for a second link (either the UL or the DL) and the RN may determine the network resources allocated for the second link based on the network resources allocated for the first link (block 469).

If the network resource allocation is an asymmetric allocation, then the RN may also receive a second indication of allocated network resources from the D-eNB (block 471). In general, if the RN receives the second indication, then the network resource allocation was an asymmetric network resource allocation and the first indication may convey information about network resource units allocated for the first link and the second indication may convey information about network resource units allocated for the second link and the RN may determine the network resources allocated for the first link and the second link from the first indication and the second indication, respectively (block 471).

The RN may make use of network resources in the allocated network resource units to communicate with the DeNB (block 475).

As an example, consider a 3GPP LTE Release-10 compliant communications system, an indication for a symmetric network resource allocation for an UL may be implicitly based on an explicit DL network resource allocation. An 8-bit bitmap may be used as an indication. The indication may indicate eight subsets and/or patterns with 40 ms periodicity. In a possible evolution of the system, with a 10 ms RTT, a 6-bit bitmap may be used as an indication. The indication may indicate six subframes, subsets, and/or patterns with 10 ms periodicity.

Figure 5A:
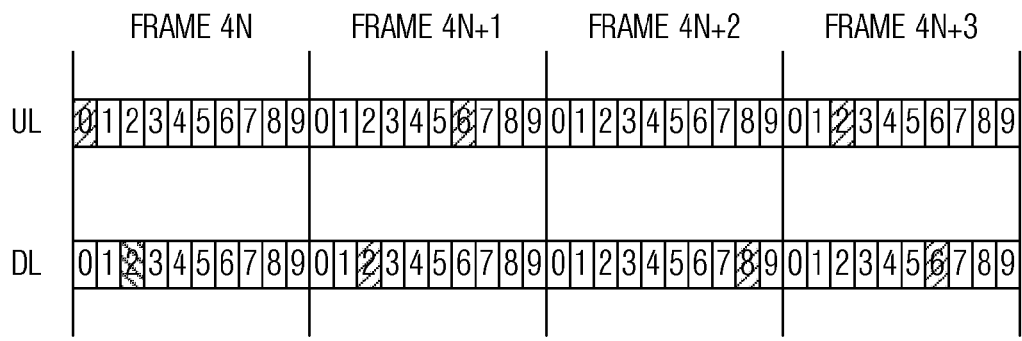
FIG. 5a illustrates an example frame structure 500 for four consecutive frames in a 3GPP LTE Release-10 compliant communications system with a current Un subframe allocation procedure, with an indication for an asymmetric network resource allocation being based on a symmetric network resource allocation according to example embodiments described herein.

FIG. 5a illustrates a frame structure 500 for four consecutive frames in an evolution of the 3GPP LTE Release-10 compliant communications system, with an indication for an asymmetric network resource allocation being based on a symmetric network resource allocation. The indication for the asymmetric network resource allocation may include a first field that contains an indication (e.g., an 8-bit bitmap) for the symmetric network resource allocation for both the DL and the UL and a second field that contains an indication (e.g., a 24-bit bitmap) for network resources allocated for the DL that are not allocated in the UL. Some subframes, such as MBSFN subframes (e.g., subframes 0, 4, 5, and 9) may not be allocated to the RN. Consider frame structure 500 as an example, the first field may contain a bitmap with values 0000 1000 (meaning that subset and/or pattern four is used for the symmetric network resource allocation) and the second field may contain a bitmap with value 0100 0000 0000 0000 0000 0000 (meaning that in the DL, subframe two in the first frame (frame 4N) is also allocated to the DL).

Figure 5B:
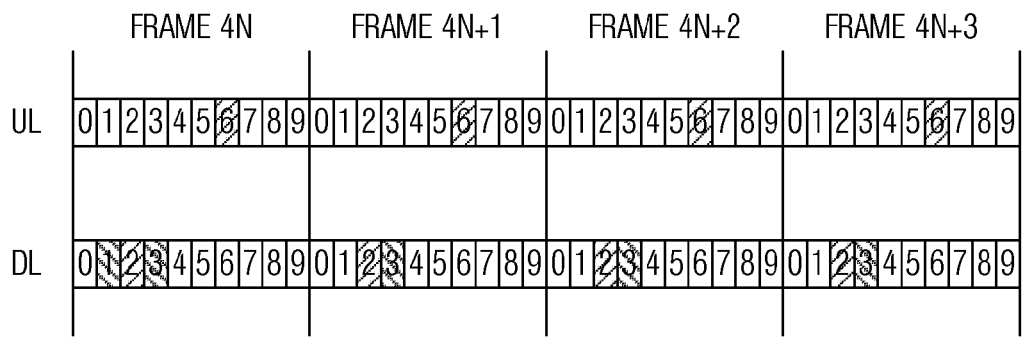
FIG. 5b illustrates an example frame structure 520 for four consecutive frames with another possible Un subframe allocation procedure, with an indication for an asymmetric network resource allocation being based on a symmetric network resource allocation according to example embodiments described herein.

FIG. 5b illustrates a frame structure 520 for four consecutive frames in a possible evolution of a 3GPP LTE Release-10 compliant communications system with 10 ms RTT, with an indication for an asymmetric network resource allocation being based on a symmetric network resource allocation. The indication for the asymmetric network resource allocation may include a first field that contains an indication (e.g., a 8-bit bitmap) for the symmetric network resource allocation for both the DL and the UL and a second field that contains an indication (e.g., a 24-bit bitmap) for network resources allocated for the DL that are not allocated in the UL. Some subframes, such as MBSFN subframes (e.g., subframes 0, 4, 5, and 9) may not be allocated to the RN. Consider frame structure 520 as an example, the first field may contain a bitmap with values 0000 1000 (meaning that subframe 6 (the fourth subframe) is used for the symmetric network resource allocation) and the second field may contain a bitmap with value 111000 011000 011000 011000 (meaning that in the DL, subframes {1, 2, 3}, {2, 3}, {2, 3}, and {2, 3} of frames 4N, 4N+1, 4N+2, and 4N+3 are also allocated to the DL).

FIG. 5c illustrates a frame structure 540 for four consecutive frames in a possible evolution of a 3GPP LTE Release-10 compliant communications system, with an indication for an asymmetric network resource allocation being based on a symmetric network resource allocation. The indication for the asymmetric network resource allocation may include a first field that contains an indication (e.g., an 8-bit bitmap) for the network resource allocation for the UL and a second field that contains an indication (e.g., an 8-bit bitmap) for network resources allocated for the DL, including subframes that are not allocated in the UL. Some subframes, such as MBSFN subframes (e.g., subframes 0, 4, 5, and 9) may not be allocated to the RN. Consider frame structure 500 as an example, the first field may contain a bitmap with values 0000 1000 (meaning that subset and/or pattern four is used for the symmetric network resource allocation) and the second field may contain a bitmap with value 0001 1000 (meaning that in the DL, subframes in subsets three and four allocated to the DL). It may be preferable to select standalone DL subframes nearest to paired DL subframes (with UL subframes) to reduce latency in Hybrid Automatic Repeat Requested (HARM) operation.

FIG. 5d illustrates a frame structure 560 for four consecutive frames in a possible evolution of a 3GPP LTE Release-10 compliant communications system with 10 ms RTT, with an indication for an asymmetric network resource allocation being based on a symmetric network resource allocation. The indication for the asymmetric network resource allocation may include a first field that contains an indication (e.g., a 8-bit bitmap) for the network resource allocation for the UL or the DL and a second field that contains an indication (e.g., an 8-bit bitmap) for network resources allocated for the DL, including subframes that are not allocated in the UL. Some subframes, such as MBSFN subframes (e.g., subframes 0, 4, 5, and 9) may not be allocated to the RN. Consider frame structure 560 as an example, the first field may contain a bitmap with values 0000 1000 (meaning that subset and/or pattern four is used for the symmetric network resource allocation) and the second field may contain a bitmap with value 0001 1000 (meaning that in the DL, subframes in subsets three and four allocated to the DL). It may be preferable to select standalone DL subframes nearest to paired DL subframes (with UL subframes) to reduce latency in HARQ operation.

Figure 6A:
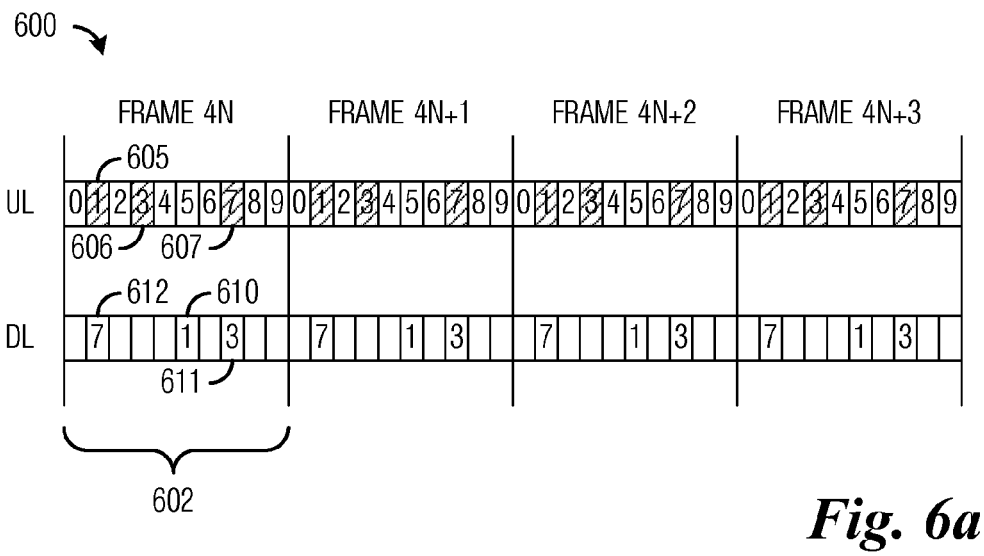
FIG. 6a illustrates an example frame structure 600 for four consecutive frames in a communications system, where DL and UL network resources are allocated symmetrically according to example embodiments described herein.

FIG. 6a illustrates a frame structure 600 for four consecutive frames in a communications system, where DL and UL network resources are allocated symmetrically. As shown in FIG. 6a, network resources for a DL may be determined implicitly from an explicitly signaled UL network resource allocation. For frame 4N 602, subframe 1 605, subframe 3 606, and subframe 7 607 may be allocated for use in the UL. Subframes that may be used in the DL may be determined from the subframes allocated for use in the UL. As an example, subframes for use in the DL may be determined by adding an offset to the subframes in the UL modulo a number of subframes in a frame.

For discussion purposes, consider subframe 1 610 may be determined by adding an offset to subframe 1 605, where the determining may be expressed as:

SF1 610=(SF1 605+offset) modulo frame_size

SF1 610=(1+4) modulo 10

SF1 610=5, where SF1 610 is the subframe number of subframe 1 610, SF1 605 is the subframe number of subframe 605, offset is the offset added to the subframe numbers, and frame_size is the number of subframes in the frame. Subframe numbers for subframe 3 611 and subframe 7 612 may be similarly found. For clarity, subframe numbers for DL subframes are shown in FIG. 6a with their corresponding UL subframe numbers. Actual DL subframe numbers may be different.

Figure 6B:
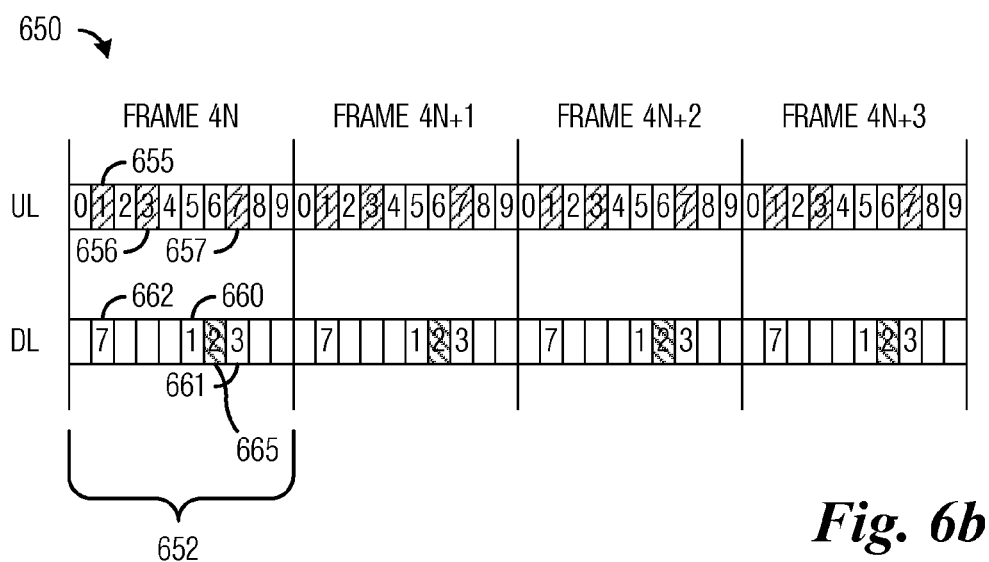
FIG. 6b illustrates an example frame structure 650 for four consecutive frames in a communications system, where DL and UL network resources are allocated asymmetrically according to example embodiments described herein.

FIG. 6b illustrates a frame structure 650 for four consecutive frames in a communications system, where DL and UL network resources are allocated asymmetrically. As shown in FIG. 6b, a portion of network resources for a DL that is symmetric to network resources for the UL may be determined implicitly from an explicitly signaled UL network resource allocation. For frame 4N 652, subframe 1 655, subframe 3 656, and subframe 7 657 may be allocated for use in the UL. Symmetric subframes that may be used in the DL (such as subframe 1 660, subframe 3 661, and subframe 7 662) may be determined from the subframes allocated for use in the UL. As an example, subframes for use in the DL may be determined by adding an offset to the subframes in the UL modulo a number of subframes in a frame, using a technique as described above.

Subframes in the DL that do not correspond to subframes in the UL, such as subframe 2 665 may be explicitly signaled in a separate indication. As an example, a separate indication that may be signaled to the RN may be a 10-bit bitmap with value 00010 00000, meaning that subframe number six is allocated to the DL. For clarity, subframe numbers for DL subframes are shown in FIG. 6b with their corresponding UL subframe numbers. Actual DL subframe numbers may be different.

Figure 7:
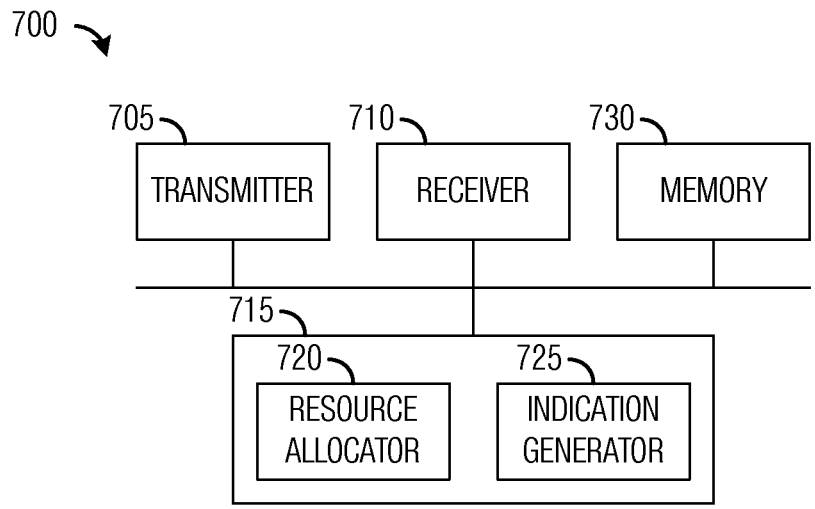
FIG. 7 illustrates an example communications device according to example embodiments described herein.

FIG. 7 provides an alternate illustration of a communications device 700. Communications device 700 may be an implementation of a D-eNB. Communications device 700 may be used to implement various ones of the embodiments discussed herein. As shown in FIG. 7, a transmitter 705 is configured to transmit information and a receiver 710 is configured to receive information. A resource allocator 720 is configured to allocate network resources to an UL and/or DL of a communications link. Resource allocator 720 is configured to allocate network resources symmetrically or asymmetrically to the UL and/or the DL based on a number of considerations, such as available bandwidth, bandwidth demand, usage history, communications system condition, and so forth. An indicator generator 725 is configured to generate indications to be transmitted to RNs served by communications device 700. Indicator generator 725 generates indications based on a nature of the network resource allocation (i.e., symmetric or asymmetric), indication method to be used (e.g., single message, dual message, indicator, and so on), communications system configuration (e.g., RTT values for a 3GPP LTE Release-10 compliant communications system), and so forth. A memory 730 is configured to store network resource allocation information, communications system configuration information, usage history, bandwidth requests, etc.

The elements of communications device 700 may be implemented as specific hardware logic blocks. In an alternative, the elements of communications device 700 may be implemented as software executing in a processor, controller, application specific integrated circuit, or so on. In yet another alternative, the elements of communications device 700 may be implemented as a combination of software and/or hardware.

As an example, receiver 710 and transmitter 705 may be implemented as a specific hardware block, while resource allocator 720 and indicator generator 725 may be software modules executing in a microprocessor (such as processor 715) or a custom circuit or a custom compiled logic array of a field programmable logic array.

Figure 8:
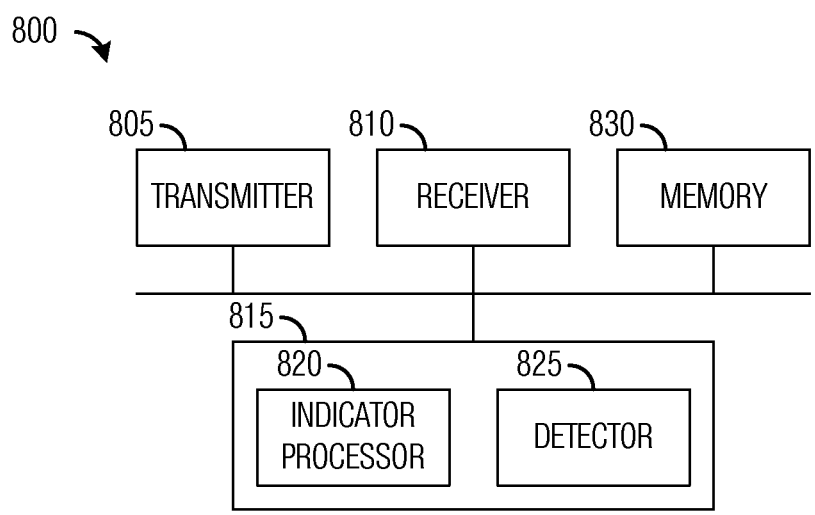
FIG. 8 illustrates an example communications device according to example embodiments described herein.

FIG. 8 provides an alternate illustration of a communications device 800. Communications device 800 may be an implementation of a RN. Communications device 800 may be used to implement various ones of the embodiments discussed herein. As shown in FIG. 8, a transmitter 805 is configured to transmit information and a receiver 810 is configured to receive information. An indicator processor 820 is configured to determine allocated network resources for an UL and/or a DL based on an indication(s) received from a D-eNB. Indicator processor 820 is configured to determine the allocated network resources based on the indication(s), configured information (e.g., allocatable and non-allocatable network resources), network resource allocation type (e.g., symmetric or asymmetric), and so on. A detector 825 is configured to detect transmissions at network resources. A memory 830 is configured to store allocated network resources, configured information, network resource allocation types, and so on.

The elements of communications device 800 may be implemented as specific hardware logic blocks. In an alternative, the elements of communications device 800 may be implemented as software executing in a processor, controller, application specific integrated circuit, or so on. In yet another alternative, the elements of communications device 800 may be implemented as a combination of software and/or hardware.

As an example, receiver 810 and transmitter 805 may be implemented as a specific hardware block, while indicator processor 820 and detector 825 may be software modules executing in a microprocessor (such as processor 815) or a custom circuit or a custom compiled logic array of a field programmable logic array.

The above described embodiments of communications device 700 and communications device 800 may also be illustrated in terms of methods comprising functional steps and/or non-functional acts. The previous description and related flow diagrams illustrate steps and/or acts that may be performed in practicing example embodiments of the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use (or non use) of steps and/or acts in the recitation of the claims—and in the description of the flow diagrams(s) for FIGS. 2a, 2b, 3b, 3c, 4b, and 4c—is used to indicate the desired specific use (or non-use) of such terms.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for communications system operations, the method comprising:

allocating network resources to a communications link, wherein the communications link comprises an uplink (UL) part and a downlink (DL) part;

when a type of the allocated network resources is not equal in the DL part and the UL part, transmitting a first indication of the allocated network resources for one part of either the UL part or the DL part and a second indication of the allocated network resources for a remaining part of either the UL part or the DL part, wherein the first indication and the second indication are in accordance with an amount of network resources allocated; and when the type of the allocated network resources is equal in the DL part and the UL part, transmitting one non-blank indication of the allocated network resources for one part of either the UL part or the DL part, wherein the indication is in accordance with an amount of network resources allocated, and a blank indication to signify that a network resource allocation for a first link is the same as a network resource allocation for a second link.

2. The method of claim 1, wherein the indication comprises an N-bit long bitmap with each bit in the N-bit long bitmap representing a network resource unit, a pattern of network resource units, a subset of network resource units, or combinations thereof.

3. The method of claim 2, wherein an indicator of the type of the allocated network resources is also transmitted in response to determining that a network resource allocation is equal in the DL part and the UL part.

4. The method of claim 3, wherein the indication and the indicator of the type of the allocated network resources is transmitted in a single message.

5. The method of claim 1, wherein the first indication comprises an N-bit long bitmap with each bit in the N-bit long bitmap representing a network resource unit, a pattern of network resource units, a subset of network resource units, or combinations thereof, where N is an integer value.

6. The method of claim 5, wherein the second indication comprises an M-bit long bitmap with each bit in the M-bit long bitmap representing a network resource unit, a pattern of network resource units, a subset of network resource units, or combinations thereof, where M is an integer value.

7. The method of claim 6, wherein M is less than or equal to N.

8. The method of claim 1, wherein the first indication and the second indication are transmitted in a single message.

9. The method of claim 1, wherein the first indication is transmitted in a first message and the second indication is transmitted in a second message.

10. The method of claim 9, wherein the first message has a different format than the second message.

11. The method of claim 1, wherein transmitting a first indication further comprises transmitting an indicator of the type of the allocated network resources.

12. The method of claim 1, wherein the second indication comprises information related to allocated network resources in a network resource allocation for the remaining part but not in a network resource allocation for the one part.

13. The method of claim 1, wherein the second indication comprises information related to allocated network resources in a network resource allocation for the one part but not in a network resource allocation for the remaining part.

14. The method of claim 1, wherein the indication, the first indication, and the second indication each comprises only information related to network resources that are allocatable to the communications link.

15. The method of claim 1, wherein the indication is transmitted using radio resource control signaling or the first indication and the second indication are transmitted using radio resource control signaling.

16. A method for communications device operations, the method comprising:
receiving an indication of allocated network resources for a communications link, wherein the communications link comprises an uplink (UL) part and a downlink (DL) part, wherein the indication is in accordance with an amount of network resources allocated, and a type of network resources allocation, and wherein the type of network resource allocation comprises either an equal allocation or an unequal allocation, further comprising receiving only one non-blank indication when the network resource allocation is the equal allocation;
determining the allocated network resources from the indication; and
utilizing a subset of the allocated network resources to communicate,
wherein the indication comprises a first indication of allocated network resources of one part of either the UL part or the DL part and a second indication of the type of network resource allocation, and wherein the type of network resource allocation is an equal network resource allocation.

17. The method of claim 16, wherein the indication indicates allocated network resources of one part of either the UL part or the DL part, and wherein determining the allocated network resources comprises:
determining the allocated network resources for the one part according to the indication; and
determining the allocated network resources for a remaining part in accordance with the allocated network resources for the one part.

18. The method of claim 16, wherein the determining the allocated network resources comprises:
determining the allocated network resources for the one part according to the first indication; and
determining the allocated network resources for a remaining part of either the UL part or the DL part in accordance with the allocated network resources for the one part.

19. The method of claim 18, wherein determining the allocated network resources for a remaining part of either the UL part or the DL part comprises adding an offset to each allocated network resource in the allocated network resources for the one part modulo a network resource period, where the offset and the network resource period are communications system specific values.

20. The method of claim 16, wherein the indication comprises a third indication of a network resource allocation for one part of either the UL part or the DL part and a fourth indication of a network resource allocation for a remaining part of either the UL part or the DL part, and wherein determining the allocated network resources comprises:
determining the allocated network resources for the one part in accordance with the third indication; and
determining the allocated network resources for the remaining part in accordance with the fourth indication.

21. The method of claim 20, wherein the allocated network resources for the remaining part are also determined in accordance with the third indication.

22. A communications system comprising:
a resource allocator configured to allocate network resources to a communications link, wherein the communications link comprises an uplink (UL) part and a downlink (DL) part;
an indication generator coupled to the resource allocator, the indication generator configured
to generate one non-blank indication of the allocated network resources for one part of either the UL part or the DL part in response to determining that a network resource allocation is equal in the DL part and the UL part, or
to generate a first indication of the allocated network resources for one part of either the UL part or the DL part and a second indication of the allocated network resources for a remaining part of either the UL part or the DL part in response to determining that the network resource allocation is not equal in the DL part and the UL part,
wherein the indication, the first indication, and the second indication are in accordance with an amount of network resources allocated; and
a transmitter coupled to the indication generator, the transmitter configured to transmit only the one non-blank indication when the network resource allocation is equal in the DL part and the UL part, or to transmit the first indication and the second indication when the network resource allocation is not equal in the DL part and the UL part to a communications device,
wherein the network resource allocation is an equal allocation, and wherein the transmitter transmits the one non-blank indication comprises the transmitter transmitting an indication of either the allocated network resources for the UL part or the allocated network resources for the DL part to the communications device and a blank indicator to the communications device.

23. The communications system of claim 22, wherein the network resources allocation is an unequal allocation, wherein the transmitter transmits the first indication and the second indication to the communications device, and wherein the second indication comprises network resources allocated in the network resource allocation for the remaining part but not in the network resource allocation for the one part.

24. The communications system of claim 22, wherein the network resources allocation is an unequal allocation, wherein the transmitter transmits the first indication and the second indication to the communications device, and wherein the second indication comprises network resources allocated in the network resource allocation for the one part but not in the network resource allocation for the remaining part.

25. The communications system of claim 22, wherein the one non-blank indication, the first indication, and the second indication each comprises only information related to network resources that are allocatable to the communications link.

26. A method for communications system operations, the method comprising:
- allocating network resources to a communications link, wherein the communications link comprises an uplink (UL) part and a downlink (DL) part;
- when a type of the allocated network resources is not equal in the DL part and the UL part, transmitting a first indication of the allocated network resources for one part of either the UL part or the DL part and a second indication of the allocated network resources for a remaining part of either the UL part or the DL part, wherein the first indication and the second indication are in accordance with an amount of network resources allocated; and
- when the type of the allocated network resources is equal in the DL part and the UL part, transmitting an indication of the allocated network resources for one part of either the UL part or the DL part and transmitting a blank indication, wherein the indication is in accordance with an amount of network resources allocated.

* * * * *